United States Patent [19]

Inoue et al.

[11] Patent Number: 4,841,312

[45] Date of Patent: Jun. 20, 1989

[54] THERMAL-ELECTROSTATIC INK JET RECORDING APPARATUS

[75] Inventors: Nanao Inoue; Koichi Saito; Ryoki Kato; Hiroshi Fujimagari; Yoshihiko Fujimura; Seiichi Kato; Koichi Naito; Kiyoshi Horie, all of Kanagawa, Japan

[73] Assignee: Fuji Xerox Co., Ltd., Tokyo, Japan

[21] Appl. No.: 126,125

[22] Filed: Nov. 27, 1987

[30] Foreign Application Priority Data

Nov. 27, 1986 [JP] Japan .............................. 61-280579

[51] Int. Cl.[4] .............................................. G01D 15/16

[52] U.S. Cl. ................................. 346/160 R; 400/126

[58] Field of Search .................. 346/140 PD; 400/126

[56] References Cited

U.S. PATENT DOCUMENTS 4,710,780 12/1987 Saito et al. .................. 346/140 PD

FOREIGN PATENT DOCUMENTS 55-69469 5/1980 Japan .

55-161664 12/1980 Japan .

56-37163 4/1981 Japan .

*Primary Examiner*—E. A. Goldberg

*Assistant Examiner*—Huan H. Tran

*Attorney, Agent, or Firm*—Finnegan, Henderson, Farabow, Garrett, & Dunner

[57] ABSTRACT

A thermal-electrostatic ink jet recording head is formed of two spaced-apart insulating substrates with an electrostatic field forming electrode and an array of electric heating elements in the slit between the substrates. The heating elements are paired and each of the adjacent heating elements of a pair joined by a common electrode, with each heater having an independent electrode connectable to a switching circuit for selectively heating portions of the ink under the influence of an electrostatic field to cause ink in the heated portions to be jetted. The common electrode preferably is U-shaped with each of its free ends connected to the inner ends of the adjacent electrodes of a pair.

12 Claims, 4 Drawing Sheets

THERMAL-ELECTROSTATIC INK JET RECORDING APPARATUS

FIELD OF THE INVENTION

The present invention generally relates to ink jet recording apparatus, and particularly it relates to an improvement in ink jet recording apparatus of the type in which ink is caused to jet by using thermal energy and electrostatic energy.

BACKGROUND OF THE INVENTION

Conventionally, there has been known an ink jet recording apparatus of the type in which orifices, the number corresponding to the image density, are provided in a number of ink discharge devices for enclosing ink, and a pressure pulse is selectively applied to the ink discharge devices so that ink is jetted from the orifices.

In the apparatus of that type, there have been problems as follows. It is necessary to make the ratio of the size of each orifice to that of the corresponding ink discharge device large in order to keep the orifice from becoming clogged with ink. Accordingly, it is difficult to make the ink discharge devices small in size, it is necessary to make the pitch of the orifices correspondingly large, and it is impossible to set the image recording density high. Further, because of the use of mechanical scanning in applying the pressure pulses, the recording speed is inevitably lowered.

As means solving those problems, there has been proposed the so-called magnetic ink jet method in which magnetic ink is disposed in the vicinity of a magnetic electrode array. An ink discharge state corresponding to the image density is formed by using swell of ink due to the magnetic field, and the magnetic ink is caused to jet toward a recording sheet in an electrostatic field (Japanese Patent Unexamined Publication No. 55-69469). There has also been proposed the so-called plane ink jet method in which a slit-ink reservoir parallel to an electrode array is filled with ink, and the ink is caused to jet toward a recording sheet in accordance with an electric field pattern formed between the electrode array and an electrode opposed to the electrode array through the recording sheet (Japanese Patent Unexamined Publication No. 56-37163). Further, the so-called thermal bubble jet method has been proposed, in which thermal energy is applied to ink so as to abruptly heat the ink to cause film boiling. Bubbles are abruptly formed in the orifices so that the ink is caused to jet from orifices by pressure rising there (Japanese Patent Unexamined Publicaiton No. 55-161664).

In the application of the magnetic ink jet method, however, there has been a problem in that it is necessary to use a mixture of ink with magnetic powder so that the ink is black, and it is difficult to obtain a color picture by printing through superposition of ink. In the application of the plane ink jet method, although improvement in blockage with ink can be made because minute orifices are not necessary, application of a high voltage is required to cause ink to jet, so that it is necessary to drive the electrode array in time division in order to prevent voltage leakage from occurring between adjacent electrodes. Further, in the application of the thermal bubble jet method, there have been problems in that it is necessary to abruptly raise the temperature of the heating elements in order to generate film boiling, so that there is a tendency for the characteristics of the ink to be changed, and the protective layer provided for the heating resistors may be thermally deteriorated.

In order to solve such problems, the present inventors have proposed a thermal-electrostatic ink jet recording apparatus which comprises, as shown in FIG. 6, a head body d constituted of a pair of insulating substrates a and b opposed to each other and having a slit-like space portion c formed therebetween, thermal energy application means e for applying thermal energy to ink in the slit-like space portion c, and electrostatic field formation means q for forming a predetermined electrostatic field between the ink surface and a recording sheet f, so that thermal energy is selectively applied, in accordance with image signals, to the ink and the selectively heated portion of the ink under the influence of the predetermined electrostatic field is caused to jet toward the sheet f.

In the thermal-electrostatic ink jet recording apparatus of the above type, it becomes unnecessary to use magnetic ink, as in the magnetic ink jet method, and therefore it is possible to easily realize color printing through superposition of ink. Further, it becomes unnecessary to cause ink to jet only by means of an electrostatic field, unlike the case of the plane ink jet method, so that it becomes unnecessary to make the intensity of the electrostatic field extremely high. Accordingly, voltage leaks in the vicinity of the ink can be effectively prevented. Furthermore, it becomes unnecessary to cause ink to jet only by means of thermal energy, unlike the case of the so-called bubble jet method, so that the quantity of thermal energy can be reduced to an extent and thermal deterioration of ink can be effectively prevented. Therefore, in the proposed apparatus of the type described above, high speed and high density recording can be carried out while effectively preventing the disadvantages in the various conventional systems.

In such a thermal-electrostatic ink jet recording apparatus as described above, the main portion of the thermal energy application means e is constituted, as illustrated in FIG. 6, by a plurality of heating resistors h provided respectively for picture elements and disposed in the slit-like space portion c at portions near the side edge of the discharge opening. A pair of current conduction electrode i and i are provided on each of the heating resistors h for selectively causing a current to flow to each of the heating resistors h. A switching circuit k is connected to the pairs of current conduction electrodes i and i and includes switching elements j arranged to be opened/closed in accordance with signals from a control device (not shown).

In such a thermal-electrostatic ink jet recording apparatus, therefore, there has been a problem in that it is necessary to connect all the pairs of current conduction electrodes i and i of the respective heating resistors h to the switching circuit k, so that the switching circuit k is complicated and the recording head is high in manufacturing cost. If the picture density required for the thermal-electrostatic ink jet recording apparatus is increased, there is a problem in that it becomes difficult to make the switching circuit k so as to satisfy the above requirement.

Alternatively, therefore, an improved thermal-electrostatic ink jet recording apparatus has been developed in which, as shown in FIG. 7, a conductive layer n is provided on the pairs of current conduction electrodes i and i through an insulating layer m. One of the pair of current conduction electrodes i and i of each of the respective heating resistors h is connected commonly to the conductive layer n through a corresponding through hole p formed in the insulating layer m to thereby simplify the arrangement of the switching circuit k. That is, in the apparatus, one of the pair of current conduction electrodes i and i of each of the respective heating resistors h, along with one of the current conduction electrodes of the other resistors, are commonly bonded to the conductive layer n to maintain the one group of current conduction electrodes i at a common potential. The other of each of the pairs of current conduction electrodes i is coupled to the switching circuit k. Thus, the formation of the switching circuit k can be simplified.

In such an improved thermal-electrostatic ink jet recording apparatus, however, there have been further problems in that it is necessary to provide a pair of current conduction electrodes i and i for every heating resistor h similarly to the thermo-electrostatic ink jet recording apparatus illustrated in FIG. 6, so that it is complicated to make the electrodes with a high density. Further, it is necessary to provide the through holes p in the insulating layer m equal in number to the heating resistors h at the same pitch as the latter, so that the operation of forming the through holes is complicated. Accordingly, the recording head productivity is lowered and the manufacturing cost of the recording head is higher. Further, if the required density of the picture elements is high, it is difficult to satisfy this requirement.

SUMMARY OF THE INVENTION

It is therefore an object of the present invention to solve the aforementioned problems.

It is another object of the present invention to provide a thermal-electrostatic ink jet recording apparatus in which high density picture recording can be made and the manufacture of the apparatus can be simplified.

In order to attain the above objects, the ink jet recording apparatus of the present invention provides an ink jet recording apparatus having a recording head formed of two spaced apart insulating plates, each having an inner face and providing a slit therebetween for containing an ink to be jetted from said head onto a recording sheet. The head has a discharge side toward the recording sheet from which the ink is to be jetted and a base side opposite the discharge side. Electrostatic field forming electrode means is provided for forming an electrostatic field between ink in the slit and the recording sheet, and includes a field forming electrode positioned in the slit. Thermal energy applying means are provided for selectively heating unit areas of the ink in response to image signals to cause ink in the unit areas to be jetted under the influence of the electrostatic field toward the recording sheet. The thermal energy applying means includes a plurality of electric resistance heaters arrayed adjacent one another on one of the inner faces adjacent the discharge side, each of the heaters having a pair of spaced-apart electric current conducting electrodes connected thereto and extending from the heater toward the base side. The first of the pair is a common electrode connected to the common electrode of one adjacent heater and the second of the pair is an independent electrode connectable to a switching circuit for selectively causing an electric current to flow through heaters in response to image signals.

In the apparatus, the head body may be suitably modified in design. That is, any head body may be used so long as it has at least a slit-like space portion. Taking the workability in providing the thermal energy application means into consideration, it is preferable that the head body is arranged such that a pair of insulating substrates previously provided with thermal energy application means are separately disposed through a spacer member. The longitudinal dimension and the slit width of the slitlike space portion are suitably set taking in consideration the range of picture formation and the density of the picture, respectively.

The thermal energy application means may comprise a plurality of heating resistors provided for the respective picture elements, a group of current conduction electrodes in which adjacent ends of each pair of the heating resistors are provided with a common electrode and the other sides of the pair each connected to independent electrodes, and a switching circuit for making a current flow into the heating resistors in accordance with an image control signal. It is preferred to maintain the common electrodes at a common potential, while it is preferred to connect the independent electrodes to switching elements of the switching circuit respectively so that a voltage can be applied independently to each of the heating resistors in accordance with an image control signal. The common electrodes may be bonded by a conductive layer provided on an insulating layer on the groups of current conduction electrodes through through holes formed in the insulating layer, or the common electrodes may be directly connected to the switching circuit. The current conduction to the common electrodes and the independent electrodes may be carried out by using the independent electrodes as the current supply electrodes and the common electrodes as the return side electrodes, or, alternatively, by using the common electrodes as the current supply electrodes and the independent electrodes as the return side electrodes.

The electrostatic field formation means may be suitably modified. That is, any electrostatic field formation means may be used so long as it can form an electrostatic field between the ink surface and the recording sheet so as to cause the ink to jet toward the recording sheet.

The ink to be used in the apparatus according to the invention may be suitably selected. That is, any ink may be used so long as the ink can be enabled to jet when thermal energy is applied to the ink. In that case, as specific jetting conditions of the ink, it is required that the viscosity and the surface tension of the ink are lowered and the conductivity of the ink is increased so that the ink is enabled to jet by the electrostatic field acting on the ink.

In the apparatus according to the present invention, as described above, the thermal energy application means comprises a plurality of heating resistors respectively provided for picture elements in the slit-like space portion adjacent the edge of the slit on discharge side thereof. A pair of current conductive electrodes is provided for each of the heating resistors for selectively causing a current to flow into the heating resistor. Each set of two adjacent resistors is connected by a single common electrode. Accordingly, the number of the current conduction electrodes can be reduced so that the density of the electrodes can be lowered, and therefore the switching circuit can be simplified correspondingly.

DETAILED DESCRIPTION OF PREFERRED EMBODIMENTS

Referring to the accompanying drawings, embodiments of the thermal-electrostatic ink jet recording apparatus according to the present invention will be described in detail hereunder.

FIRST EMBODIMENT

Figure 1:
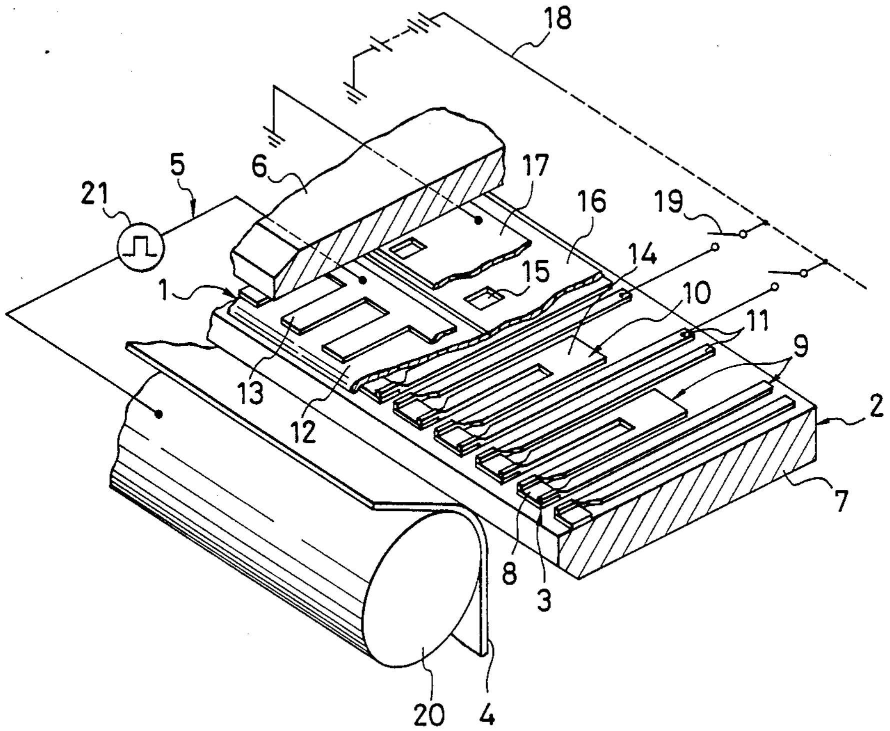
FIG. 1 is a schematic perspective view partly showing a first embodiment of the thermal-electrostatic ink jet recording apparatus according to the present invention.
Figure 3:
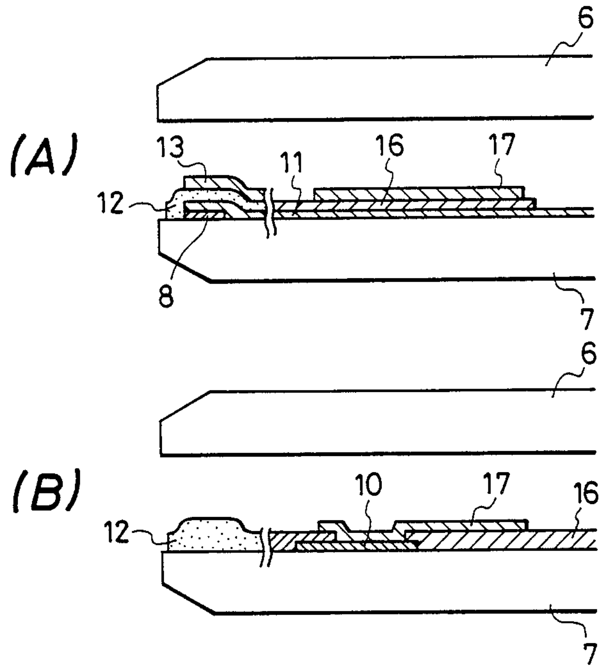
FIG. 3A is a cross-section taken on line A—A of FIG. 2.
FIG. 3B is a cross-section taken on line B—B of FIG. 2.

Referring to FIGS. 1 3, the ink jet recording apparatus is provided with a head body 2 having a slit-like space portion 1, thermal energy application means 3 for applying thermal energy to ink received in the slit-like space portion 1, and electrostatic field formation means 5 for forming a field formation means 5 for forming a electrostatic field of a predetermined level between an ink surface in the head and a recording sheet 4.

In the embodiment, the head body 2 is constituted by a pair of insulating substrates, or plates, 6 and 7 of, for example, a ceramic such as alumina, each having a thickness of 1 mm and each having a glass spacer of a thickness of about 60 μm formed thereon. The insulating substrates 6 and 7 are heat-bonded to each other with a heat-fused paste and special glass spacer (not shown) heat-fused on one of the substrates 6 and 7 so as to define the gap of the slit-like space portion, which has a gap dimension of 100 μm. The respective discharge side edge portions of the insulating substrates 6 and 7 are ground linearly as shown in FIG. 1.

Figure 2:
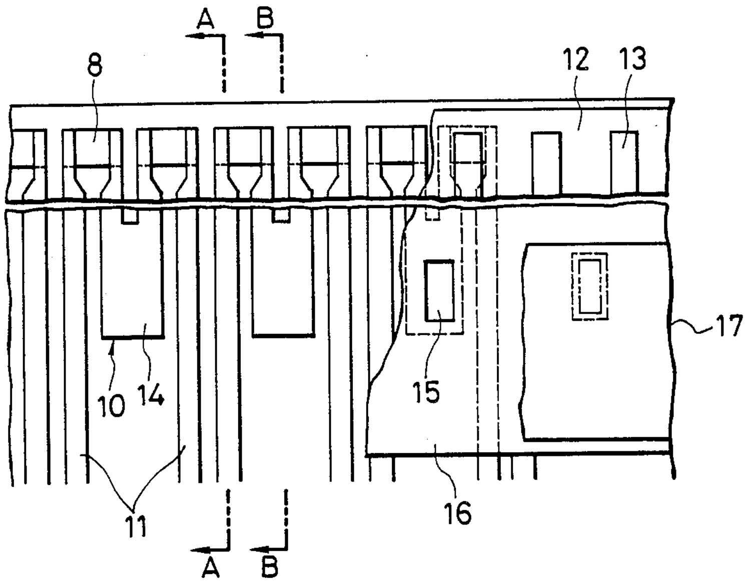
FIG. 2 is a partially cutaway plan view of the embodiment of FIG. 1.

As shown in FIGS. 1 and 2, the thermal energy application means 3 preferably comprises an array of electric heating elements in which heating resistors 8, each made of $Ta_2N$ and having a thickness of 300 angstroms, are arranged for every picture element (eight dots per mm) on the insulating substrate 7. Each of the heating resistors 8 is formed of a film through the reactive sputtering method and is shaped into a rectangle of 110 μm×70 μm through photo-lithographic processing and plasma etching processing. The heating resistors 8 are disposed so as to face the edge of the slit-like space portion 1 on the discharge side.

Current conduction electrodes 9 are connected to the heating resistors 8. The current conduction electrodes 9 are formed in a manner so that uniform and continuous layers of an alloy of Ni-Cr of about 500 angstroms and Au of about 1 μm are successively deposited through evaporation and then processed through photolithographic etching. The current conduction electrodes 9 include substantially U-shaped common electrodes 10 and linear independent electrodes 11. The heating resistors 8 are grouped into a plurality of pairs each consisting of two adjacent heating resistors, so that in each pair of the heating resistors 8, one of the U-shaped common electrodes 10 is connected at its free ends respectively to adjacent, or inner, sides of the two heating resistors 8 in the pair. Each of the linear independent electrodes 11 is respectively connected to the respective other, or outer, end of one of the two heating resistors 8 in the pair, and extends toward the base side of the recording head opposite to the discharge side where the heating resistors 8 are provided.

A protecting layer 12 of, e.g., $SiO_2$ having a thickness of 2 mm and formed through an RF sputtering method is provided on the current conduction electrodes 9 on the side near heating resistors 8, and a head-side electrode 13 for forming an electrostatic field is provided in a manner so that respective layers of Cr of about 100 angstroms, Cu of about 8000 angstroms, and Cr of about 100 angstroms are successively deposited in order through evaporation, and comb-like shaped through the photo-lithographic etching processing. In forming the protecting layer 12, a mask is put on the base side of the current conduction electrodes 9 so as to prevent the protecting layer 12 of $SiO_2$ from being formed on the current conduction electrodes 9 at their base side.

An insulating layer 16 is provided to cover the base sides of the current conduction electrodes 9. The insulating layer 16 is formed in a manner so that a coating of photo-sensitive polyimide resin (Photoneece UR 3100, tradename, produced by TORAY INDUSTRIES INC.) is provided through a spincoat method, heat treated (prebaking) at 80° C. for 60 minutes, and subjected to pattern exposure processing. The unexposed portions are removed through solvent treatment so as to form a plurality of 200 μm×500 μm rectangular through holes 15 in the portions adjacent to root connecting portions 14 of the respective common electrodes 10. The coating is then heat treated again at 180° C. for 30 minutes, at 300° C. for 30 minutes, and at 400° C. for 30 minutes in a nitrogen atmosphere so as to make the above polyimide resin be imide.

A conductive layer 17 is provided on the insulating layer 16. The conductive layer 17 is formed in a manner so that an alloy of Ni-Cr of about 500 angstroms and Au of about 1 μm are successively deposited through evaporation in a vacuum. The respective root connecting portions 14 of the common electrodes 10 are bonded to the conductive layer 17 through the respective through hole portions 15. The insulating layer 16 and the conductive layer 17 are formed by masking the discharge side of electrodes 13, similar to the formation of the protecting layer 12. A sputtering method of forming an insulating thin layer such as $SiO_2$ or the like, or a thin-film printing method of forming a thin film of resin, such as polyimide resin or the like, may be employed for the formation of the insulating layer 16, instead of the exposure method in which exposure processing is performed with use of photo-sensitive resin.

The conductive layer 17 is grounded as shown in FIG. 1 so that all the common electrodes 10 are maintained at a common potential. The independent electrodes 11 are respectively connected to corresponding switching elements 19 of a switching circuit 18 so that a voltage can be applied to the heating resistors 8 independently of each other in accordance with a picture control signal.

As shown in FIG. 1, the electrostatic field formation means 5 is preferably coupled by the discharge side electrode 13 provided on the head body 2 side, a roll-like electrostatic induction electrode, or counter electrode 20 separated by 300 μm from the ink surface of the slit-like space portion 1 and arranged to function as a surface for supporting the recording sheet 4, an electrostatic induction power source 21 interposed between the discharge side electrode 13 and the counter electrode 20 so as to form an electrostatic field directed from the ink surface toward the electrostatic induction electrode 20. Instead of forming the discharge side electrode 13 on the heating resistors 8 through the protecting layer 12, the discharge side electrode 13 may be provided on the insulating substrate 6 on the opposite side to the heating resistors 8.

As the ink contained in the slit-like space portion 1, there is used conductive oil ink having characteristics of viscosity of 35 cps, surface tension of 36 dyne/cm, and volume resistivity of $1\times10^8$ cm at room temperature (20° C.). These characteristics are lowered to viscosity of 1 cps, surface tension of 20 dyne/cm, and volume resistivity of $3\times10^6$ cm in heating by the heating resistors (180° C.).

Accordingly, in the ink jet recording apparatus of the embodiment, when a driving pulse is applied to the selected heating resistors 8 of the thermal energy application means 3 in accordance with image signals corresponding to the picture information to be recorded, the selected heating resistors 8 are heated so that thermal energy is applied to ink unit regions corresponding to the selected heating resistor 8 to thereby heat the ink unit regions. Then, in the heated ink unit regions, the viscosity and surface tension of the ink are lowered to the values described above and the conductivity of the ink is increased. When an electrostatic control pulse of 200V/300 μm is applied to the electrostatic induction electrode 20 of the electrostatic field formation means 5 in synchronism with the driving of the thermal energy application means 3, an electrostatic field is formed between the ink surface and the counter electrode 20, so that, under the influence of the thus formed electrostatic field, the heated ink unit regions are caused to jet toward the recording paper 4 which is passing by the front side of the electrostatic induction electrode 20, whereby ink dots are formed on the recording sheet 4.

The apparatus of this embodiment has advantages in that since the current conduction electrodes 9 of the thermal energy application means 3 are constituted by the independent electrodes 11 and the common electrodes 10, the number of the electrodes is reduced in comparision with the conventional apparatus so that the electrode density is reduced correspondingly and the formation of the electrodes is easier. Accordingly, in the recording head in this apparatus, the pitch of the heating resistors 8 can be made narrow so that the quality of picture formed by the ink dots is improved in comparison with the conventional apparatus.

The apparatus of this embodiment has further advantages in that not only can the current conduction electrodes 9 be easily formed, but the number of the through hole portions 15 formed in the insulating layer 16 is reduced to one-half of that of the previous conventional apparatus in which every heating resistor required one through hole, so that the forming of the through holes is made easier. Accordingly, the apparatus is improved in yield and is simplified in manufacture.

SECOND EMBODIMENT

Figure 4:
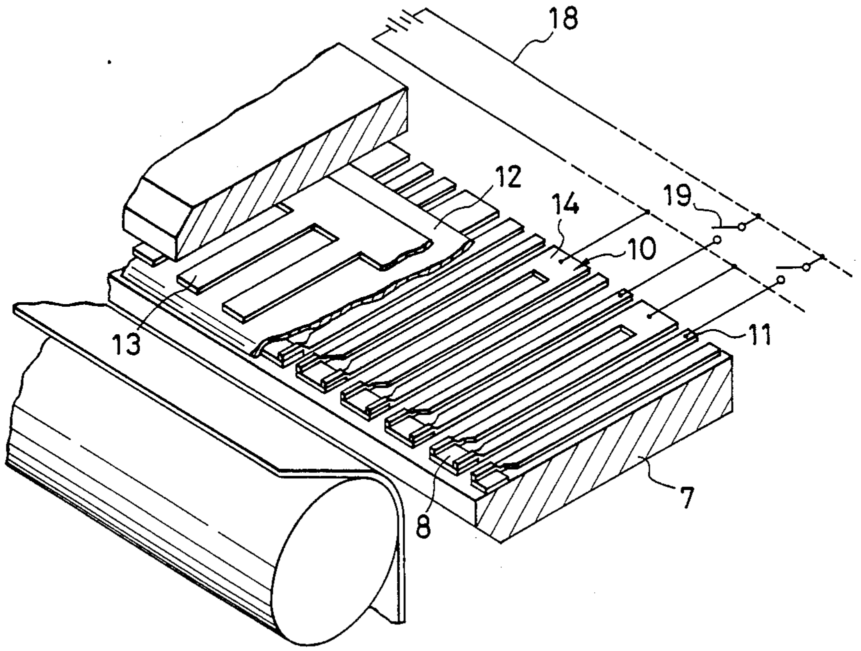
FIG. 4 is a schematic perspective view showing a second embodiment of the thermal-electrostatic ink jet recording apparatus according to the present invention.
Figure 5:
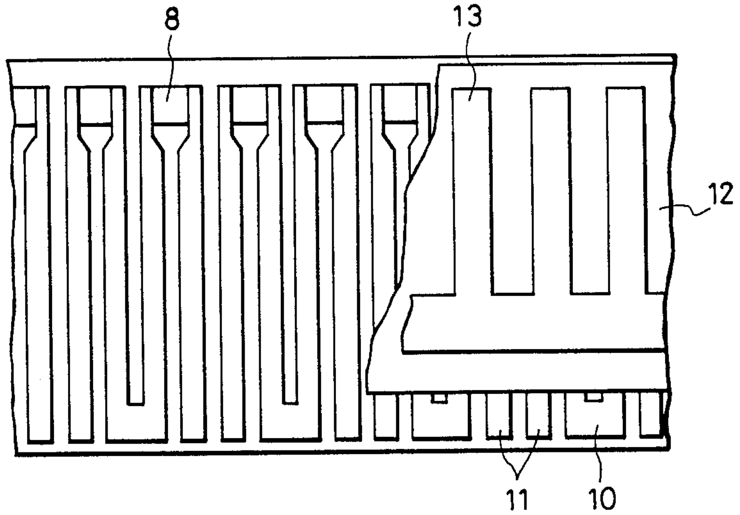
FIG. 5 is a partially cutaway plan view of the second embodiment.

In contrast to the ink jet recording apparatus of the first embodiment, in which the common electrodes 10 are maintained commonly at a predetermined potential using the through holes 15, the ink jet recording apparatus of the second embodiment illustrated in FIGS. 4 and 5 is arranged in a manner so that connecting portions 14 of respective common electrodes 10 are extended toward the base side, and the common electrodes 10 and the independent electrodes 11 are made to register with each other at the respective base side ends thereof and both the electrodes 10 and 11 are directly connected to the switching circuit 18.

That is, particularly, the apparatus of the second embodiment is arranged in a manner so that heating registors 8, the independent electrodes 11, and the common electrodes 10 are formed on an insulating substrate 7. A protecting layer 12 of $SiO_2$ is formed on the insulating substrate to cover the heating resistors 8, the independent electrodes 11, and the common electrodes 10 except the base end portions of the electrodes 10 and 11. A comb-like head-side electrode 13 is provided on the protecting layer 12, and the independent electrodes 11 and the common electrodes 10 are connected to the switching circuit 18.

The apparatus of this embodiment also has advantages in that the electrode density is reduced and the formation of the electrodes is easier, the recording head is constituted by the heating resistors formed with a narrow pitch so that printing can be made with good picture quality, and the apparatus is improved in yield and is simplified in manufacture.

As described above, the present invention has meritorious effects in that it is possible to reduce the density of the current conduction electrodes for causing a current to flow into the selected heating resistors, so that the manufacture of the apparatus can simplified and recording can be made with high picture density because the pitch of arrangement of the heating resistors can be narrowed.

Having described preferred embodiments of the present inventions, it is understood that variations and modifications thereof, falling within the spirit and scope of the appended claims, will become apparent to those skilled in the art.

What is claimed is:

1. An ink jet recording apparatus comprising:

(a) a recording head formed of two spaced apart insulating plates, each having an inner face and providing a slit therebetween for containing an ink to be jetted from said head onto a recording sheet, said head having a discharge side toward the recording sheet from which the ink is to be jetted and a base side opposite said discharge side;

(b) electrostatic field forming electrode means for forming an electrostatic field between ink in said slit and the recording sheet, including a field forming electrode positioned in said slit; and (c) thermal energy applying means for selectively heating unit areas of the ink in response to image signals to cause ink in said unit areas to be jetted under the influence of the electrostatic field toward said recording sheet, said thermal energy applying means including a plurality of electric resistance heaters arrayed adjacent one another on one of said inner faces adjacent said discharge side, each of said heaters having a pair of spaced-apart electric current conducting electrodes connected thereto and extending from said heater toward said base side, the first of said pair being a common electrode for each said heater and one heater adjacent thereto and the second of said pair being an independent electrode connectable to a switching circuit for selectively causing an electric current to flow through each of said heaters in response to image signals.

2. The apparatus of claim 1, wherein the common electrodes are grounded and maintained at a common potential.

3. The apparatus of claim 1, wherein said current conducting electrodes are formed on one of said inner faces, and said apparatus further comprises an insulating layer on said current conducting electrodes, said insulating layer having a plurality of through holes formed therein over a portion of said common electrodes, and a conductive layer on said insulating layer bonded to said common electrodes through said through holes.

4. The apparatus of claim 1, wherein said independent electrodes and said common electrodes are directly connectable to the switching circuit.

5. The apparatus of claim 1, further including a protective layer formed on said current conducting electrodes adjacent said heaters, and wherein said electric field forming electrode is formed on said protective layer adjacent said discharge side.

6. The apparatus of claim 5, further including a counter electrode spaced apart from and opposite said discharge side of said recording head and adapted to support the recording sheet, and a power source connected to said electrostatic field forming electrode and to said counter electrode for forming an electrostatic field directed from said recording head toward said counter electrode.

7. An ink jet recording apparatus comprising:

(a) a recording head formed of two spaced apart insulating plates, each having an inner face and providing a slit therebetween for containing an ink to be jetted from said head onto a recording sheet, said head having a discharge side toward the recording sheet from which the ink is to be jetted and a base side opposite said discharge side;

(b) electrostatic field forming electrode means for forming an electrostatic field between ink in said slit and the recording sheet, including a field forming electrode positioned in said slit; and (c) thermal energy applying means for selectively heating unit areas of the ink in response to image signals to cause ink in said unit areas to be jetted under the influence of the electrostatic field toward said recording sheet, said thermal energy applying means including a plurality of electric resistance heaters arranged adjacent one another on one of said inner faces adjacent said discharge side, each of said heaters having an independent electrode connectable to a switching circuit for selectively causing an electric current to flow through the heater in response to image signals, wherein said heaters are grouped into a plurality of pairs, each pair comprising two adjacent heaters, each of said heaters having an inner end and an outer end, said apparatus further including a plurality of U-shaped common electrodes, each of said common electrodes being associated with a different one of said pairs of heaters, each said common electrode having first and second free ends, said first free end being connected to said inner end of one of said heaters in said associated pair and said second free end being connected to said inner end of the other of said heaters of said associated pair, and said independent electrode of each said heater being connected to the outer end of said heater.

8. The apparatus of claim 7, wherein the common electrodes are grounded and maintained at a common potential.

9. The apparatus of claim 7, wherein said independent electrode of each of said heaters and said common electrodes are formed on one of said inner faces, and said apparatus further comprises an insulating layer on said independent electrodes and said common electrodes, said insulating layer having a plurality of through holes formed therein over a portion of said common electrodes, and a conductive layer on said insulating layer bonded to said common electrodes through said through holes.

10. The apparatus of claim 7, wherein said independent electrodes and said common electrodes are directly connectable to the switching circuit.

11. The apparatus of claim 7, further including a protective layer formed on said independent electrodes and said common electrodes adjacent said heaters, and wherein said electrostatic field forming electrode is formed on said protective layer adjacent said discharge side.

12. The apparatus of claim 11, further including a counter electrode spaced apart from and opposite said discharge side of said recording head and adapted to support the recording sheet, and a power source connected to said electrostatic field forming electrode and to said counter electrode for forming an electrostatic field directed from said recording head toward said counter electrode.

* * * * *

UNITED STATES PATENT AND TRADEMARK OFFICE

CERTIFICATE OF CORRECTION

PATENT NO. : 4,841,312

DATED : June 20, 1989

INVENTOR(S) : Nanao Inoue et al.

It is certified that error appears in the above-identified patent and that said Letters Patent is hereby corrected as shown below:

IN THE DRAWINGS - Sheet 4 of 4

Figure 6:
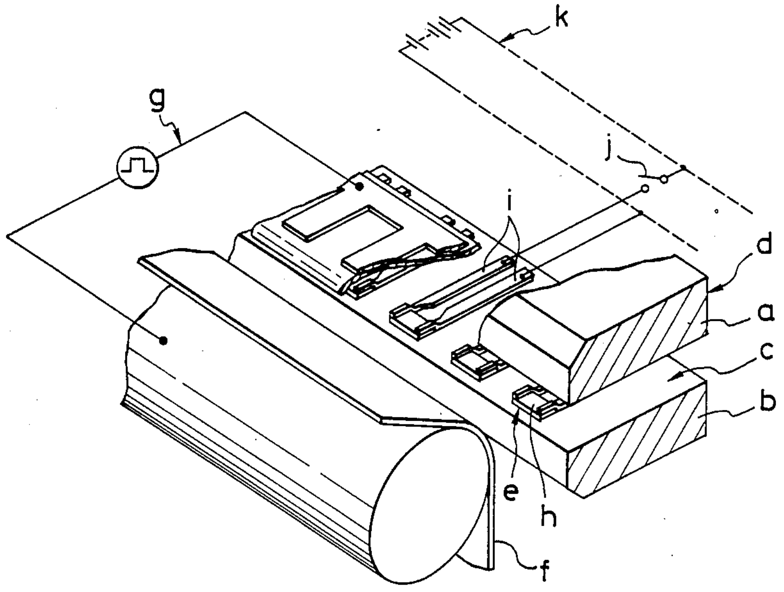
FIG. 6 PRIOR ART
FIGS. 6 and 7 are schematic perspective views showing examples of the earlier developed thermal-electrostatic ink jet recording apparatus.
Figure 7:
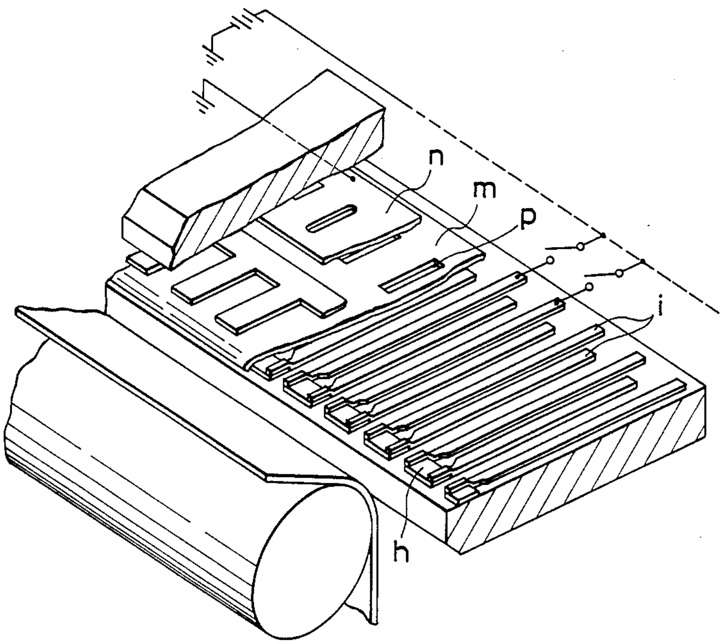
FIG. 7 PRIOR ART

--Delete the term "PRIOR ART" from Figures 6 and 7, respectively.

Signed and Sealed this

Twenty-fifth Day of June, 1991

Attest:

HARRY F. MANBECK, JR.

Attesting Officer

Commissioner of Patents and Trademarks